Patented Aug. 12, 1947

2,425,686

UNITED STATES PATENT OFFICE 2,425,686

THERMOSTATIC CONTROL OF ELECTRIC HEATING PADS

Malcolm E. Porter, Middleboro, Mass., assignor to The Lobl Manufacturing Company, Middleboro, Mass., a corporation of Massachusetts Application September 22, 1945, Serial No. 617,948

8 Claims. (Cl. 219—46)

This invention relates to improvements in electric circuit controls and more especially to thermally responsive controls for electric circuits in which the energizing and de-energizing of a main heating element are responsive to temperature variations at a thermostatic switch, the rate-of-rise of whose controlling temperature is selectively variable by varying the relative heat-generating effects as between the main heating element and an auxiliary heating element. One important utility of the invention is for the control of electric heating pads wherein it is desirable to provide selective temperatures at which the pad may be operated, such as high, medium and low heat settings which may approximate, for example, Fahrenheit temperatures of 180, 160 and 140 degrees, respectively.

It is an object of the invention to provide an electric circuit control of an electrical resistance heating element which can more effectively control the operation of the heating element at any selected one of a plurality of predetermined operating temperatures, as compared with comparable prior controls of which I am aware. I provide a main resistance heating element whose operation is to be controlled, an auxiliary heater in parallel with the main heating element, and a thermostatic switch in heat-receiving relation to both heaters and operative to make and break the circuits to both heaters in response to predetermined changes in temperature of a thermal element of the switch, with selective means for varying the rate-of-rise of the temperature of said thermal element by varying the relative heat-transferring effects of the two heaters.

Another object is to provide an electric circuit control of a main resistance heating element by selective control of an auxiliary heater connected in parallel with the main heater, both of said heaters being in heat-transferring relation to a thermostatic switch which controls current flow to both heaters in response to predetermined changes in the temperature of a thermal element of the switch.

A further object is to provide a plural-heat electric heating pad circuit control in which selection as between a plurality of operating temperatures is attained by varying, in parallel circuits, the relative current flow to the main resistance heater and to an auxiliary heater, both of which are in heat-transferring relation to a temperature responsive means which effects simultaneous opening and closing of the parallel circuits.

Yet another object is to provide an electric heating pad control wherein the main heating element and an auxiliary heating element are in parallel and in heat-transferring relation to a temperature responsive switch for both heating elements, and in which means are provided for selectively increasing the current flow to one of said heaters simultaneously with a decreasing of current flow to the other one of said heaters.

A still further object is to provide a control system for electric heating pads wherein the main heating element and an auxiliary heating element are electrically connected in parallel, and in which a thermally responsive switch controls current flow to both heating elements and is in heat-receiving relation to both of said heating elements, with means for selectively varying the current flow to the main heating element while maintaining the current flow to the auxiliary heating element approximately constant.

It is, moreover, my purpose and object generally to improve upon prior control circuits and particularly such circuits for controlling plural-heat electric heating pads.

Figure 1:
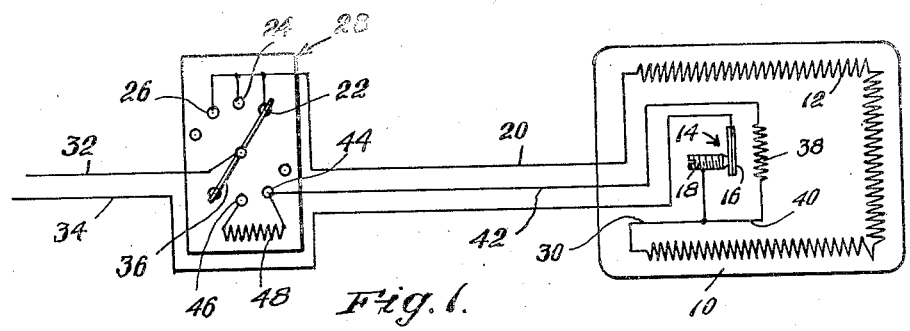
Figure 1 is a diagrammatic view of an electric heating pad having circuit-controlling means embodying features of my present invention.

Referring to the drawing, the heating pad 10 may be regarded as representative of electrical devices in general which have a resistance heating element in heat-transferring relation to a temperature responsive means which effects opening and closing of the circuit to the heating element. The main resistance heating element of the illustrated pad is indicated at 12, and a thermostatic switch is represented generally at 14, with a bi-metal contact 16 shown in contact with a fixed but adjustable contact 18. The bi-metal contact 16 is of a common type which warps away from contact 18, to open the circuit, in response to predetermined changes in the temperature of the bi-metal contact 16. The switch 14 is mounted on the pad 10 in heat-receiving relation to the main heating element 12, so that rise in the temperature of the bi-metal contact 16 primarily is due to rise in ambient temperature.

The main heating element 12 has one end electrically connected by conductor 20 to each of the three fixed contacts 22, 24 and 26 of a four-position manually operable switch indicated generally at 28. The other end of heating element 12 is connected by conductor 30 to one side of the thermostatic switch 14, which may be the fixed contact 18 as shown. The supply conductors 32, 34 may lead from any suitable source of electrical potential, conductor 32 being connected to the manually operable switch member 36, and conductor 34 being connected to the other side of the thermostatic switch which, as shown, is the bi-metal contact 16.

In what I now consider to be a preferred embodiment of the invention, shown in Fig. 1, the manually operable switch member 36 is movable to any one of three circuit-closed positions and to a fourth circuit-open position. In Fig. 1, the switch member is in its position contacting the fixed contact 22 of the manual switch for maximum current flow to the main heating element 12, this being the high heat position in the disclosed embodiment which has a medium heat position, a low heat position and an off position. For example, with the switch member 36 in its position of Fig. 1, the heating pad 12 may be elevated to a temperature of say 180 degrees Fahrenheit before the thermostatic switch 14 acts to open the circuit, in which case, the ultimate opening of the circuit results primarily from the increased ambient temperature due to heat transfer from the heating element 12, although the bi-metal is heated to some extent directly due to current flow therein.

According to the invention, operation of the heating pad at a medium temperature of say 160 degrees Fahrenheit and at a low temperature of say 140 degrees Fahrenheit may be attained by connecting an auxiliary heater 38 in parallel with the main heating element 12 and in heat-transferring relation to the thermostatic switch 14. As seen in Fig. 1, one end of the auxiliary heater 38 is connected by conductor 40 to the conductor 30 at a location between the main heating element 12 and the thermostatic switch 14. The other end of the auxiliary heater is connected by conductor 42 to the fixed contact 44 at the manual switch 28. This fixed contact 44 is positioned to be engaged by switch member 36 when the latter is moved counter-clockwise from its position of Fig. 1 to its position engaging fixed contact 26. Hence, with switch member 36 engaging both fixed contacts 26 and 44 both of the heating elements 12 and 38 are energized and both supply heat for quickly elevating the temperature of the bi-metal contact 16 to a predetermined temperature at which it will warp away from fixed contact 18 to open the circuits to both heaters. Hence the thermostatic switch will operate to open the circuit before the element 12 will have raised the temperature of the heating pad above a predetermined low operating temperature of say around 140 degrees Fahrenheit.

Still another fixed contact 46 at manual switch 28 is in position for the switch member 36 to engage it simultaneously with the fixed contact 24. A resistance element 48 connects contact 46 with contact 44 so that, when the switch arm 36 engages contact 46, the resistance element 48 is connected in series with auxiliary heater 38 so that current flow to the auxiliary heater 38 is reduced with consequent reduction in the amount of heat which it generates. Hence, it takes somewhat longer for the thermostatic switch to open as compared with the previously described low heat condition in which both the main heater 12 and the auxiliary heater 38 are generating heat at their maximum capacities. As a result, the main heating element 12 has time to elevate the temperature of the pad to a medium heat of say around 160 degrees Fahrenheit.

Figure 2:
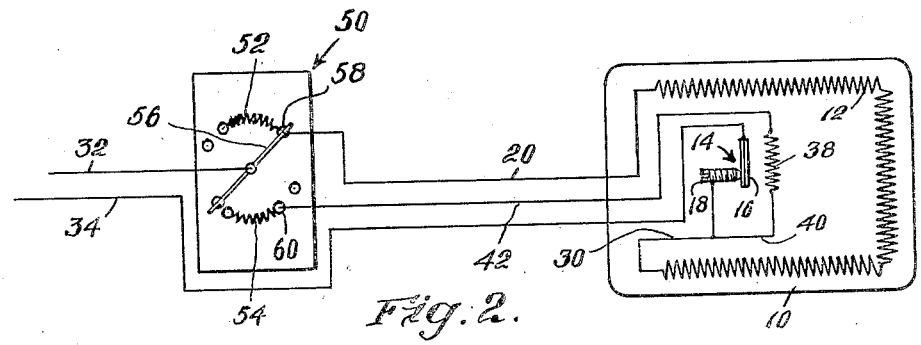
Figure 2 is a similar diagrammatic view of a modified form of the invention as illustrated in Figure 1.

In the modification of Fig. 2, the manual switch indicated generally at 50, has two rheostats 52, 54 with the manually operable switch member 56 constituting the movable element of each rheostat. In this case, the conductor 20 conects one end of the main heating element 12 of pad 10 to the terminal 58 of rheostat 52, and the parallel circuit conductor 42 connects the auxiliary heater 38 with the terminal 60 of rheostat 54. As shown in Fig. 2, the switch member 56 is in contact only with rheostat 52, at its terminal 58, so that only the main heating element 12 of the pad is energized, and none of the resistance of rheostat 52 is in the circuit. The parallel circuit to the auxiliary heater 38 is open. Hence the switch setting in Fig. 2 is for high heat at the pad and heat-transfer from the main heating element 12 controls the thermostatic switch 14. Counter-clockwise movement of switch member 56 brings more and more of the resistance of rheostat 52 into the circuit to the main heater 12 and, after the initial counter-clockwise movement connects the full resistance of rheostat 54 in the parallel circuit, less and less of this resistance remains in the parallel circuit with continued counter-clockwise movement of switch member 56, and the auxiliary heater 38 increasingly affects the operation of the thermostatic switch 14. Hence the pad 10, in this case may be set for any of a multiplicity of heats between the high heat setting of Fig. 2 and a low heat setting in which the switch member 56 engages the terminal 60 of rheostat 54.

Figure 3:
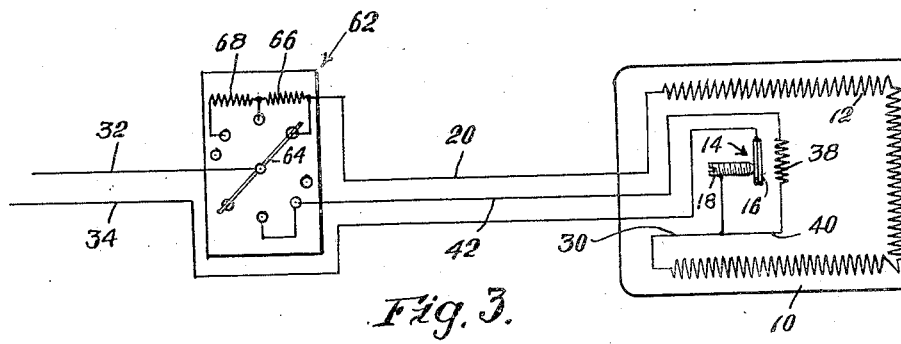
Figure 3 is a diagrammatic view illustrating another modification.

In the Fig. 3 modification, the manual switch, indicated generally at 62, has a high heat position, a medium heat position, a low heat position and an "off" position. As shown, the switch member 64 is in the high heat position, with maximum current flow to the main heater 12 and with the parallel circuit to the auxiliary heater 38 open. Counter-clockwise movement of switch member 64 first cuts in resistance element 66 in the circuit to the main heater 12 and a further counter-clockwise movement causes both the resistance element 66 and a second resistance element 68 to be in the circuit to the main heater 12, thereby reducing the current flow to main heating element 12. Simultaneously the parallel circuit to the auxiliary heater 38 will have been energized, and its heating effect is uniform in both the medium and low heat positions of switch member 64.

It will be obvious from the foregoing description that I have provided simple and effective circuit control for electrical devices in which a main resistance heating element is the primary member requiring control, such as the main heating element of an electric heating pad. A thermostatic switch is operative to open and close both the main circuit to the main heating element and a parallel circuit to an auxiliary heating element, the two heaters being in heat-transferring relation to the thermostatic switch. And a manual switch is operable to energize the auxiliary heater selectively and to vary the rate-of-rise of the controlling temperature at the thermostatic switch, by varying the relative current flow to the main and auxiliary heaters.

I claim as my invention:

1. A thermostatic control system comprising a main resistance heating element, a source of electrical potential electrically connected for energizing said element, temperature responsive means for making and breaking the electrical connection between said element and the source of electrical potential and located in heat-receiving relation to said element, an auxiliary resistance heater in heat-transferring relation to said temperature responsive means and connected in parallel with the main heating element with said temperature responsive means arranged for making and breaking the electrical connection between said auxiliary resistance heater and the source of electrical potential, manually operable means for controlling both the circuit to said main heating element and the parallel circuit to said auxiliary heating element, said manually operable means being movable to one position in which it closes the circuit to said main heating element and opens the parallel circuit to said auxiliary heating element, and to second and third positions wherein it closes both said circuits to energize both heating elements, there being resistance means associated with the manually operable means whereby the current flow to one of said heating elements is different in each of the three positions of the manually operable means.

2. A thermostatic control system comprising a main heating element and an auxiliary heating element electrically connected in parallel, temperature responsive means operative in response to predetermined temperature changes to open and close the circuits to both heating elements, said means being in heat-receiving relation to both said elements, manually operable means connected to a source of electrical potential and movable to a position for closing a circuit through only the main one of said heating elements, and movable to a second position for closing parallel circuits through both of said heating elements, there being a resistance element in the circuit to the auxiliary heating element in the second position of the manually operable means, and there being a third position of the manually operable means in which said resistance element is cut out of the circuit to the auxiliary heating element thereby to increase the current flow to the auxiliary heating element, the current flow to the main heating element being approximately constant in each of said three positions of the manually operable means.

3. In an electric heating pad, a main heating element having conductors at its opposite ends for connecting it to a source of electrical potential, temperature responsive means in one of said conductors for opening and closing the circuit to said element in response to predetermined temperature changes at said temperature responsive means, the latter said means being in heat-receiving relation to said heating element, an auxiliary heating element in heat-transferring relation to the temperature responsive means and connected in parallel with the main heating element, whereby the latter said means controls the auxiliary heating element, and manually operable means in the conductor at the other end of the main heating element for varying the relative current flow to the two said heating elements, thereby to vary the rate-of-rise of the temperature at said temperature responsive means.

4. In an electric heating pad, a main heating element and an auxiliary heating element connected in parallel, temperature responsive means in heat-receiving relation to both of said heating elements and responsive to predetermined temperature changes to open the parallel circuits to both of said heating elements, and manually operable means for varying the relative current flow in said parallel circuits, thereby to vary the rate-of-rise of the temperature at the temperature responsive means.

5. In an electric heating pad, a main heating element and an auxiliary heating element connected in parallel, temperature responsive means in heat-receiving relation to both of said heating elements and responsive to predetermined temperature changes to open the parallel circuits to both of said heating elements, a resistance element in the circuit to one of the heating elements, and manually operable means for energizing only one of said heating elements when in one position, and for energizing both of said heating elements when in second and third positions, with said resistance element connected in the circuit to one of the heating elements only in said second position of the manually operable means.

6. In an electric heating pad, a main heating element and an auxiliary heating element connected in parallel, temperature responsive means in heat-receiving relation to both of said heating elements and responsive to predetermined temperature changes to open the parallel circuits to both of said heating elements, a pair of resistance elements in the circuit to the main heating element, and manually operable means for energizing the main heating element alone, with said resistance elements cut out of the circuit, in one position, and for energizing both heating elements in second and third positions, with one of said resistance elements cut into the circuit to the main heating element in the second position, and with both said resistance elements cut into the said circuit in the third position of the manually operable means.

7. In an electric heating pad, a main heating element and an auxiliary heating element connected in parallel, temperature responsive means in heat-receiving relation to both of said heating elements and responsive to predetermined temperature changes to open the paralllie circuits to both of said heating elements, manually operable means for energizing only the main heating element in one position thereof, and for energizing both of said heating elements in each of a plurality of other positions thereof, and resistance means coacting with said manually operable means in the said other positions of the latter for selectively reducing the current flow to the main heating element and simultaneously increasing the current flow in the auxiliary heating element.

8. In an electric heating pad, a main heating element and an auxiliary heating element connected in parallel, temperature responsive means in heat-receiving relation to both of said heating elements and responsive to predetermined temperature changes to open the parallel circuits to both of said heating elements, a resistance element in the circuit to the auxiliary heating element, and manually operable means for energizing only the main heating element in one position thereof, and for energizing both of said heating elements in second and third positions thereof, said second position of the maunally operable means including said resistance element in the circuit to the auxiliary heating element, and said manually operable means, in its third position, cutting out said resistance element, thereby to hasten the rise in temperature at the temperature responsive means.

MALCOLM E. PORTER.

REFERENCES CITED

The following references are of record in the file of this patent:

UNITED STATES PATENTS

| Number | Name | Date |
|---|---|---|
| 2,024,153 | Eskin | Dec. 17, 1935 |
| 2,400,735 | Bradford | May 21, 1946 |

FOREIGN PATENTS

| Number | Country | Date |
|---|---|---|
| 448,761 | Germany | 1926 |